United States Patent
Xu et al.

(10) Patent No.: US 9,456,193 B2
(45) Date of Patent: Sep. 27, 2016

(54) METHOD AND APPARATUS FOR PROCESSING LIGHT-FIELD IMAGE

(71) Applicant: Huawei Technologies Co., Ltd., Shenzhen, Guangdong (CN)

(72) Inventors: Jing Xu, Shenzhen (CN); Zhimin Xu, Hong Kong (CN); Edmund Lam, Hong Kong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/575,091

(22) Filed: Dec. 18, 2014

(65) Prior Publication Data

US 2015/0172629 A1 Jun. 18, 2015

(30) Foreign Application Priority Data

Dec. 18, 2013 (CN) .......................... 2013 1 0697583

(51) Int. Cl.
*H04N 13/00* (2006.01)
*G06T 3/40* (2006.01)
*G06T 5/50* (2006.01)
(Continued)

(52) U.S. Cl.
CPC ......... *H04N 13/0037* (2013.01); *G06T 3/4053* (2013.01); *G06T 5/50* (2013.01); *H04N 13/025* (2013.01); *G06T 2200/21* (2013.01);
(Continued)

(58) Field of Classification Search
CPC ................ G06T 2200/21; G06T 2207/10052; G06T 3/4053; G06T 5/50; H04N 13/0037; H04N 2013/0077; H04N 5/232229; H04N 5/2256
See application file for complete search history.

(56) References Cited

U.S. PATENT DOCUMENTS

| | | | |
|---|---|---|---|
| 8,315,476 B1 | 11/2012 | Georgiev et al. | |
| 8,718,328 B1 * | 5/2014 | Gaddy | G06K 9/00624 375/240.16 |

(Continued)

FOREIGN PATENT DOCUMENTS

| | | |
|---|---|---|
| CN | 102595171 A | 7/2012 |
| EP | 2175632 A1 | 4/2010 |

OTHER PUBLICATIONS

Lumsdaine et al., "Full Resolution Lightfield Rendering," Adobe Technical Report, pp. 1-12, Adobe Systems, Inc., San Jose, California (Jan. 2008).

(Continued)

*Primary Examiner* — Jingge Wu
(74) *Attorney, Agent, or Firm* — Leydig, Voit & Mayer, Ltd.

(57) ABSTRACT

The present invention provides a method and an apparatus for processing a light-field image. The method includes: acquiring a light-field image; acquiring an occlusion tag function of each unit image in the light-field image; determining a cost function for offset estimation of each unit image according to intensity change information and gradient change information that are of each unit image in the light-field image and the occlusion tag function of each unit image; acquiring an offset of each unit image in the light-field image by using the cost function; and reconstructing a high-resolution light field by using the offset of each unit image. An offset of each unit image in a light-field image may first be acquired according to optical flow change information of the light-field image, and then a high-resolution light field is reconstructed by using the offset of each unit image, so as to effectively improve spatial resolution.

10 Claims, 3 Drawing Sheets

(51) Int. Cl.
*H04N 13/02* (2006.01)
*H04N 5/232* (2006.01)
(52) U.S. Cl.
CPC . *G06T2207/10052* (2013.01); *H04N 5/23229* (2013.01); *H04N 2013/0077* (2013.01)

(56) References Cited

U.S. PATENT DOCUMENTS

| | | | | |
|---|---|---|---|---|
| 8,780,113 | B1* | 7/2014 | Ciurea | H04N 13/0022 345/427 |
| 2005/0129325 | A1* | 6/2005 | Wu | G06T 7/0022 382/254 |
| 2006/0256134 | A1* | 11/2006 | Widdowson | G06T 11/60 345/629 |
| 2007/0253028 | A1* | 11/2007 | Widdowson | G06T 11/60 358/1.18 |
| 2010/0322521 | A1* | 12/2010 | Tal | G06T 11/60 382/199 |
| 2011/0080487 | A1 | 4/2011 | Venkataraman et al. | |
| 2011/0176722 | A1* | 7/2011 | Sizintsev | G06T 7/0022 382/154 |
| 2012/0287329 | A1 | 11/2012 | Yahata | |
| 2013/0136299 | A1* | 5/2013 | Kim | G06T 7/2006 382/103 |
| 2014/0079336 | A1* | 3/2014 | Venkataraman | G06T 5/005 382/275 |

OTHER PUBLICATIONS

Bishop et al., "Light Field Superresolution," IEEE International Conference on Computational Photography, pp. 1-9, Institute of Electrical and Electronics Engineers, New York, New York (Apr. 16-17, 2009).

Bishop et al., "The Light Field Camera: Extended Depth of Field, Aliasing, and Superresolution," IEEE Transactions on Pattern Analysis and Machine Intelligence, vol. 34, No. 5, pp. 972-986, IEEE Computer Society, Washington, D.C. (May 2012).

* cited by examiner

METHOD AND APPARATUS FOR PROCESSING LIGHT-FIELD IMAGE

CROSS-REFERENCE TO RELATED APPLICATIONS

This application claims priority to Chinese Patent Application No. 201310697583.3, filed Dec. 18, 2013, which is incorporated herein by reference in its entirety.

TECHNICAL FIELD

Embodiments of the present invention relate to the communications technologies, and in particular, to a method and an apparatus for processing a light-field image.

BACKGROUND

Compared with an ordinary camera, a light-field camera collects light information in space based on light-field technologies and can shoot a three-dimensional image, where the light information includes information such as a light direction, intensity, and a color.

An existing light-field camera acquires an image based on a model: $i=PDBMl_h+e$, where i indicates an image acquired by a sensor unit, $l_h$ indicates a target to be shot, e is additive noise, P is a projection matrix used to describe a projection of light on a two-dimensional sensor unit, M is a matrix corresponding to an offset, B is a blurring feature (blurring) or a point spread function (PSF for short) of an optical system, and D is a down-sampling matrix. Because a pixel of the sensor unit of the light-field camera is small, spatial resolution of the light-field camera is low. When processing an image, an existing light-field camera improves the spatial resolution mainly by using a method of estimating the point spread function of the light-field camera and then performing reconstruction by using de-blurring technologies.

However, because of a large error between a theoretical value of the PSF and an actual situation, the method is poor in precision, and in effect of improving the spatial resolution.

SUMMARY

The present invention provides a method and an apparatus for processing a light-field image, which resolve a problem that an effect of improving spatial resolution in the prior art is poor and a problem that the prior art is not widely used.

According to a first aspect of the present invention, a method for processing a light-field image is provided, including:

acquiring a light-field image;

acquiring an occlusion tag function of each unit image in the light-field image, and determining a cost function for offset estimation of each unit image according to intensity change information and gradient change information of each unit image in the light-field image and the occlusion tag function of each unit image;

acquiring an offset of each unit image in the light-field image by using the cost function; and reconstructing a high-resolution light field by using the offset of each unit image.

With reference to the first aspect, in a first possible implementation manner, the acquiring an occlusion tag function of each unit image includes:

determining the occlusion tag function of each unit image by using at least one of the following formulas (1), (2), and (3):

$$c_1(x,y;k)=\min\{\partial_x u_k(x,y)+\partial_y v_k(x,y),0\} \quad (1)$$

where x is a horizontal coordinate of a pixel in a unit image, y is a vertical coordinate of the pixel in the unit image, k is a sequence number of the unit image, $u_k(x,y)$ is an offset of a $k^{th}$ unit image in a horizontal direction, $v_k(x,y)$ is an offset of the $k^{th}$ unit image in a vertical direction, $c_1(x,y,k)$ indicates that a boundary pixel of an occluded area has a minus optical flow value, $\partial_x$ indicates that a partial derivative in the direction of x is to be found, and $\partial_y$ indicates that a partial derivative in the direction of y is to be found;

$$c_2(x,y;k)=i_k[x+u_k(x,y),y+v_k(x,y)]-i_1(x,y) \quad (2)$$

where $i_1(x,y)$ is intensity information of a pixel whose coordinates are (x,y) in a first unit image, $i_k(x+u_k(x,y),y+v_k(x,y))$ is intensity information of a pixel whose coordinates are $(x+u_k(x,y),y+v_k(x,y))$ in the $k^{th}$ unit image, and $c_2(x,y,k)$ indicates a grayscale difference between the foregoing two pixels;

$$c_3(x,y,k) \top_{],i_1(x,y)} \acute{G}_{],i_1(x,y)} \acute{G}_{],i_k}(x\acute{G}u_k(x,y),y\acute{G}v_k(x,y)) \acute{G}_{],i_k}(x\acute{G}u_k(x,y),y\acute{G}v_k(x,y)) \quad (3)$$

where $c_3(x,y,k)$ indicates edge information of a pixel whose coordinates are (x,y) in the $k^{th}$ unit image.

With reference to the first possible implementation manner of the first aspect, in a second possible implementation manner, the occlusion tag function is:

$$f_k(x, y) = \exp\left\{-\frac{[c_1(x, y; k)]^2}{2\sigma_1^2}\right\}\exp\left\{-\frac{[c_2(x, y; k)]^2}{2\sigma_2^2}\right\}\exp\left\{-\frac{[c_3(x, y; k)]^2}{2\sigma_3^2}\right\} \quad (4)$$

where exp{ } is a Gaussian function, $\sigma_1$ is a standard deviation, corresponding to a Gaussian function $$\exp\left\{-\frac{[c_1(x, y, k)]^2}{2\sigma_1^2}\right\},$$

of normal distribution, $\sigma_2$ is a standard deviation, corresponding to a Gaussian function $$\exp\left\{-\frac{[c_2(x, y, k)]^2}{2\sigma_2^2}\right\},$$

of normal distribution, and $\sigma_3$ is a standard deviation, corresponding to a Gaussian function $$\exp\left\{-\frac{[c_3(x, y, k)]^2}{2\sigma_3^2}\right\},$$

of normal distribution.

With reference to the first aspect, the first possible implementation manner of the first aspect, or the second possible implementation manner of the first aspect, in a third possible implementation manner, the determining a cost function for offset estimation of each unit image according to intensity change information and gradient change information of each unit image in the light-field image and the occlusion tag function of each unit image includes:

determining a cost function $\Gamma_{intensity}(u_1,v_1)$ for offset estimation of each unit image by using a formula (5):

$$\Gamma_{intensity}(u_1, v_1) = \sum_{(x,y)\in\chi}\left\{\sum_{k=1}^{n^2} f_k(x,y)\Phi\{\|i_k[x+u_k(x,y), y+v_k(x,y)]-i_1(x,y)\|\}^2 + \alpha\|\nabla i_k[x+u_k(x,y), y+v_k(x,y)]-\nabla i_1(x,y)\|^2\right\} \quad (5)$$

where $\chi$ is a pixel coordinate set of each unit image, $\Phi()$ is a concave function for acquiring robustness, $\nabla$ is a gradient function, and $\alpha$ is an adjustment coefficient of the gradient change information.

With reference to the first aspect, the first possible implementation manner of the first aspect, or the second possible implementation manner of the first aspect, in a fourth possible implementation manner, the determining a cost function for offset estimation of each unit image according to intensity change information and gradient change information of each unit image in the light-field image and the occlusion tag function of each unit image includes:

determining a cost function $\Gamma_{intensity}(u_1,v_1)$ for offset estimation of each unit image by using a formula (6):

$$\Gamma_{intensity}(u_1,v_1)=\Gamma'_{intensity}(u_1,v_1)+\beta\Gamma_{smooth}(u_1,v_1) \quad (6)$$

where, $$\Gamma'_{intensity}(u_1, v_1) = \sum_{(x,y)\in\chi}\left\{\sum_{k=1}^{n^2} f_k(x,y)\Phi\{\|i_k[x+u_k(x,y), y+v_k(x,y)]-i_1(x,y)\|\}^2 + \alpha\|\nabla i_k[x+u_k(x,y), y+v_k(x,y)]-\nabla i_1(x,y)\|^2\right\},$$

$$\Gamma_{smooth}(u_1,v_1) = \sum_{(x,y)\in\chi}\Phi[\|\nabla u_1(x,y)\|^2 + \|\nabla v_1(x,y)\|^2],$$

$\chi$ is a pixel coordinate set of each unit image, $\Phi()$ is a concave function for acquiring robustness, $\nabla$ is a gradient function, $\Gamma'_{intensity}(u_1,v_1)$ is a cost subfunction for offset estimation of each unit image, $\Gamma_{smooth}(u_1,v_1)$ is a smoothing item of the cost function for offset estimation of each unit image, and $\beta$ is an adjustment coefficient of the smoothing item.

With reference to the third possible implementation manner of the first aspect or the fourth possible implementation manner of the first aspect, in a fifth possible implementation manner, the acquiring an offset of each unit image in the light-field image by using the cost function includes:

acquiring an offset between every two adjacent unit images in the light-field image by using a formula (7):

$$(u^*_1,v^*_1)=\arg\min\{\Gamma_{intensity}(u_1,v_1)\}(u_1,v_1) \quad (7)$$

acquiring the offset of each unit image in the light-field image by using formulas (8) and (9):

$$u_k(x,y)=\phi_k u_1(x,y) \quad (8)$$

$$v_k(x,y)=\psi_k v_1(x,y) \quad (9)$$

where, in the formula (7), arg is an inverse function, min is a function for finding a minimum value, $u^*_1$ is an estimated value of $u_1$, and $v^*_1$ is an estimated value of $v_1$;

$\phi_k$ in the formula (8) is a multiple of the offset of the $k^{th}$ unit image in the horizontal direction, and $\psi_k$ in the formula (9) is a multiple of the offset of the $k^{th}$ unit image in the vertical direction.

According to a second aspect of the present invention, an apparatus for processing a light-field image is provided, including:

a collecting module, configured to acquire a light-field image;

an acquiring module, configured to acquire an occlusion tag function of each unit image in the light-field image, determine a cost function for offset estimation of each unit image according to intensity change information and gradient change information that are of each unit image in the light-field image and the occlusion tag function of each unit image, and acquire an offset of each unit image in the light-field image by using the cost function; and a reconstructing module, configured to reconstruct a high-resolution light field by using the offset of each unit image.

With reference to the second aspect, in a first possible implementation manner, the acquiring module is specifically configured to:

determine the occlusion tag function of each unit image by using at least one of the following formulas (1), (2), and (3):

$$c_1(x,y;k)=\min\{\partial_x u_k(x,y)+\partial_y v_k(x,y),0\} \quad (1)$$

where x is a horizontal coordinate of a pixel in a unit image, y is a vertical coordinate of the pixel in the unit image, k is a sequence number of the unit image, $u_k(x,y)$ is an offset of a $k^{th}$ unit image in a horizontal direction, $v_k(x,y)$ is an offset of the $k^{th}$ unit image in a vertical direction, $c_1(x,y,k)$ indicates an offset variation of a pixel whose coordinates are (x,y) in the $k^{th}$ unit image in a direction of parallax change, $\partial_x$ indicates that a partial derivative in the horizontal direction is to be found, and $\partial_y$ indicates that a partial derivative in the vertical direction is to be found;

$$c_2(x,y;k)=i_k[x+u_k(x,y),y+v_k(x,y)]-i_1(x,y) \quad (2)$$

where $i_1(x,y)$ is intensity information of a first unit image, $i_k(x+u_k(x,y),y+v_k(x,y))$ is intensity information of a pixel whose coordinates are $(x+u_k(x,y),y+v_k(x,y))$ in the $k^{th}$ unit image, and $c_2(x,y,k)$ indicates a grayscale of a pixel whose coordinates are (x,y) in the $k^{th}$ unit image;

$$c_3(x,y,k)=\partial_x i_1(x,y)+\partial_y i_1(x,y)+\partial_x i_k(x+u_k(x,y),y+v_k(x,y))+\partial_y i_k(x+u_k(x,y),y+v_k(x,y)) \quad (3)$$

where $c_3(x,y,k)$ indicates edge information of the pixel whose coordinates are (x,y) in the $k^{th}$ unit image.

With reference to the first possible implementation manner of the second aspect, in a second possible implementation manner, the occlusion tag function is:

$$f_k(x,y) = \exp\left\{-\frac{[c_1(x,y;k)]^2}{2\sigma_1^2}\right\}\exp\left\{-\frac{[c_2(x,y;k)]^2}{2\sigma_2^2}\right\}\exp\left\{-\frac{[c_3(x,y;k)]^2}{2\sigma_3^2}\right\} \quad (4)$$

where $\exp\{\}$ is a Gaussian function, $\sigma_1$ is a standard deviation, corresponding to a Gaussian function $$\exp\left\{-\frac{[c_1(x, y, k)]^2}{2\sigma_1^2}\right\},$$

of normal distribution, $\sigma_2$ is a standard deviation, corresponding to a Gaussian function $$\exp\left\{-\frac{[c_2(x, y, k)]^2}{2\sigma_2^2}\right\},$$

of normal distribution, and $\sigma_3$ is a standard deviation, corresponding to a Gaussian function $$\exp\left\{-\frac{[c_3(x, y, k)]^2}{2\sigma_3^2}\right\},$$

of normal distribution.

With reference to the second aspect, the first possible implementation manner of the second aspect, or the second possible implementation manner of the second aspect, in a third possible implementation manner, the acquiring module is specifically configured to:

determine a cost function $\Gamma_{intensity}(u_1, v_1)$ for offset estimation of each unit image by using a formula (5):

$$\Gamma_{intensity}(u_1, v_1) = \quad (5)$$
$$\sum_{(x,y)\in \chi}\left\{\sum_{k=1}^{n^2} f_k(x, y)\Phi\{\|i_k[x + u_k(x, y), y + v_k(x, y)] - i_1(x, y)\|\}^2 + \alpha\|\nabla i_k[x + u_k(x, y), y + v_k(x, y)] - \nabla i_1(x, y)\|^2\right\}$$

where $\chi$ is a pixel coordinate set of each unit image, $\Phi(\ )$ is a concave function for acquiring robustness, $\nabla$ is a gradient function, and $\alpha$ is an adjustment coefficient of the gradient change information.

With reference to the second aspect, the first possible implementation manner of the second aspect, or the second possible implementation manner of the second aspect, in a fourth possible implementation manner, the acquiring module is specifically configured to:

determine a cost function $\Gamma_{intensity}(u_1, v_1)$ for offset estimation of each unit image by using a formula (6):

$$\Gamma_{intensity}(u_1, v_1) = \Gamma_{intensity}'(u_1, v_1) + \beta \Gamma_{smooth}(u_1, v_1) \quad (6)$$

where, $$\Gamma'_{intensity}(u_1, v_1) =$$
$$\sum_{(x,y)\in \chi}\left\{\sum_{k=1}^{n^2} f_k(x, y)\Phi\{\|i_k[x + u_k(x, y), y + v_k(x, y)] - i_1(x, y)\|\}^2 + \alpha\|\nabla i_k[x + u_k(x, y), y + v_k(x, y)] - \nabla i_1(x, y)\|^2\right\},$$

$$\Gamma_{smooth}(u_1, v_1) = \sum_{(x,y)\in \chi} \Phi[\|\nabla u_1(x, y)\|^2 + \|\nabla v_1(x, y)\|^2],$$

$\chi$ is a pixel coordinate set of each unit image, $\Phi(\ )$ is a concave function for acquiring robustness, $\nabla$ is a gradient function, $\Gamma_{intensity}'(u_1, v_1)$ is a cost subfunction for offset estimation of each unit image, $\Gamma_{smooth}(u_1, v_1)$ is a smoothing item of the cost function for offset estimation of each unit image, and $\beta$ is an adjustment coefficient of the smoothing item.

With reference to the third possible implementation manner of the second aspect or the fourth possible implementation manner of the second aspect, in a fifth possible implementation manner, the acquiring module is specifically configured to:

acquire an offset between every two adjacent unit images in the light-field image by using a formula (7):

$$(u^*_1, v^*_1) = \arg \min\{\ominus_{intensity}(u_1, v_1)\}(u_1, v_1) \quad (7)$$

acquire the offset of each unit image in the light-field image by using formulas (8) and (9):

$$u_k(x, y) = \phi_k u_1(x, y) \quad (8)$$

$$v_k(x, y) = \psi_k v_1(x, y) \quad (9)$$

where, in the formula (7), arg is an inverse function, min is a function for finding a minimum value, $u^*_1$ is an estimated value of $u_1$, and $v^*_1$ is an estimated value of $v_1$; $\phi_k$ in the formula (8) is a multiple of the offset of the $k^{th}$ unit image in the horizontal direction, and $\psi_k$ in the formula (9) is a multiple of the offset of the $k^{th}$ unit image in the vertical direction.

According to a method and an apparatus for processing a light-field image that are provided in the present invention, an offset of each unit image in the light-field image is acquired according to optical flow change information of the light-field image, and a high-resolution light field is reconstructed according to the offset of each unit image, so as to improve spatial resolution. In addition, the method and the apparatus for processing a light-field image that are provided in the present invention are widely used.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Figure 1:
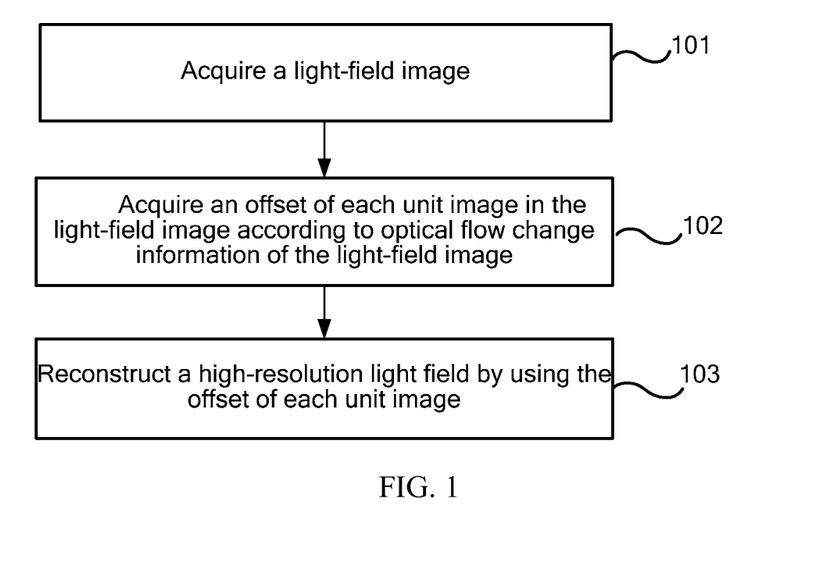
FIG. 1 is a flowchart of Embodiment 1 of a method for processing a light-field image according to the present invention.

FIG. 1 is a flowchart of Embodiment 1 of a method for processing a light-field image according to the present invention. The method in this embodiment is applicable to reconstruction of an image acquired by a light-field camera, which is usually implemented by using software or hardware. Types of light-field camera include a microlens array type, a camera array type, and other types. The method in this embodiment is applicable to any one of the foregoing types, and principles are similar. For ease of description, a light-field camera of a camera array type is used in the present invention as an example for illustration. Referring to FIG. 1, this embodiment includes the following steps:

Step 101: Acquire a light-field image.

The light-field image may be acquired by a sensor unit and converged by several unit images. For example, in a light-field camera of a camera array type, several lenses form a lens array in which each lens corresponds to its sensor unit. The light-field image is obtained by converging the unit images acquired by the sensor units corresponding to the lenses of the lens array.

Step 102: Acquire an offset of each unit image in the light-field image according to optical flow change information of the light-field image.

The optical flow change information may include information such as intensity change information and gradient change information of a pixel in a unit image. In a light-field camera, because a lens array is usually formed by n lenses arranged in a horizontal direction and n lenses arranged in a vertical direction, a different deviation is generated when each lens shoots a same target, and the different deviation corresponds to a different offset, where the offset may be resolved into an offset in the horizontal direction and an offset in the vertical direction. The offset in the horizontal direction refers to a deviation of a unit image shot by a $k^{th}$ lens in the horizontal direction, relative to a unit image shot by a first lens in the horizontal direction; and the offset in the vertical direction refers to a deviation of a unit image shot by a $k^{th}$ lens in the vertical direction, relative to a unit image shot by a first lens in the vertical direction.

Step 103: Reconstruct a high-resolution light field by using the offset of each unit image.

When a light-field camera shoots a target, a limited pixel in a sensor unit causes a low spatial resolution of the light-field camera, because when lenses shoot the target simultaneously, each of the lenses can shoot merely a part of the target due to deviations among the lenses, so that the spatial resolution is impaired. However, the impaired spatial resolution may be compensated by acquiring an offset. Specifically, a corresponding matrix M is acquired according to an offset, which is obtained in step 102 of each unit image, and the high-resolution light field is reconstructed with reference to a model i=PDBMl$_h$+e, that is, a target l$_h$ is reconstructed according to an image i acquired by the sensor unit to acquire a high-resolution l$_h$*.

In this embodiment, when a high-resolution light field is reconstructed, an offset of each unit image in a light-field image may first be acquired according to optical flow change information of the light-field image, and then a high-resolution light field is reconstructed by using the offset of each unit image, so as to effectively improve spatial resolution. In addition, this embodiment is widely used, and may be used not only in a light-field camera of a microlens array type but also in a light-field camera of a camera array type and other types.

Figure 2:
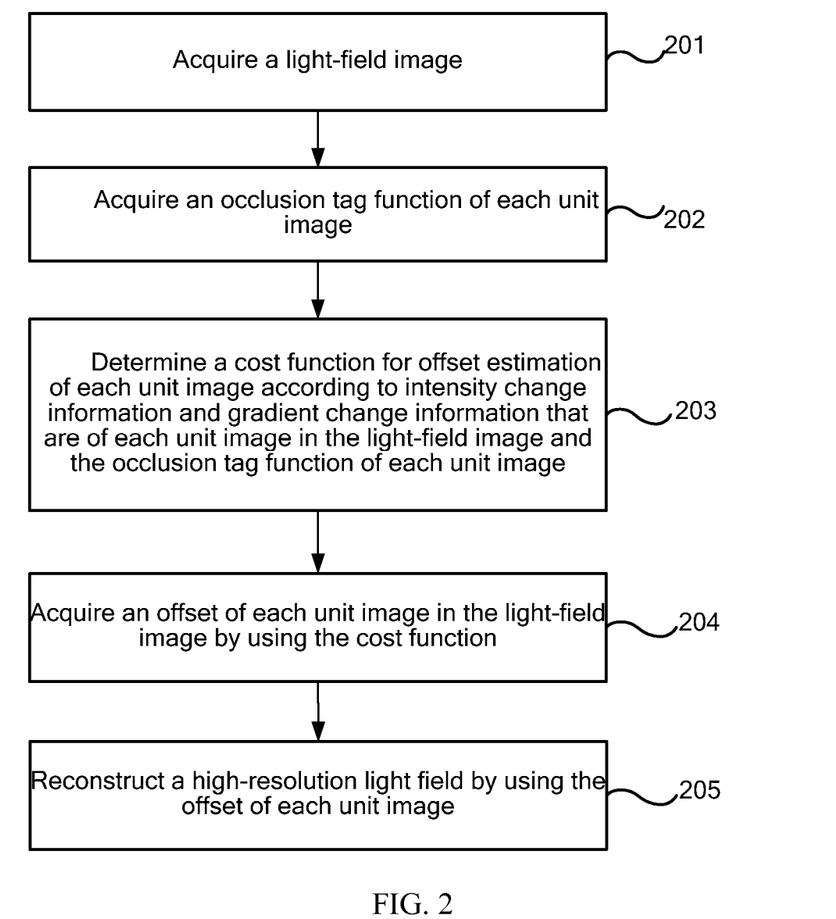
FIG. 2 is a flowchart of Embodiment 2 of a method for processing a light-field image according to the present invention.

FIG. 2 is a flowchart of Embodiment 2 of a method for processing a light-field image according to the present invention. As shown in FIG. 2, the method according to this embodiment includes the following steps:

Step 201: Acquire a light-field image.

Step 202: Acquire an occlusion tag function of each unit image.

When a light-field camera shoots a target, a situation in which an object in the middle occludes the target often occurs, causing a problem such as that an acquired image is unclear. An occlusion problem may be resolved by using the occlusion tag function. Even if the situation in which an object in the middle occludes the target does not occur, an imaging effect of each unit image may also be improved by using the occlusion tag function.

In specific implementation, the occlusion tag function of each unit image may be determined by using at least one of the following three manners:

Manner 1: The following formula (1) is used.

$$c_1(x,y;k)=\min\{\partial_x u_k(x,y)+\partial_y v_k(x,y),0\} \quad (1)$$

where x is a horizontal coordinate of a pixel in a unit image, y is a vertical coordinate of the pixel in the unit image, k is a sequence number of the unit image, $u_k(x,y)$ is an offset of a $k^{th}$ unit image in a horizontal direction, $v_k(x,y)$ is an offset of the $k^{th}$ unit image in a vertical direction, $c_1(x,y,k)$ indicates that a boundary pixel of an occluded area has a minus optical flow value, $\partial_x$ indicates that a partial derivative in the direction of x is to be found, and $\partial_y$ indicates that a partial derivative in the direction of y is to be found.

Manner 2: The following formula (2) is used.

$$c_2(x,y;k)=i_k[x+u_k(x,y),y+v_k(x,y)]i_1(x,y) \quad (2)$$

where $i_1(x,y)$ is intensity information of a pixel whose coordinates are (x,y) in a first unit image, $i_k(x+u_k(x,y),y+v_k(x,y))$ is intensity information of a pixel whose coordinates are $(x+u_k(x,y),y+v_k(x,y))$ in the $k^{th}$ unit image, and $c_2(x,y,k)$ indicates a grayscale difference between the foregoing two pixels.

Manner 3: A formula (3) is used.

$$c_1(x,y,k)=\partial_x i_1(x,y)+\partial_y i_1(x,y)+\partial_x i_1(x+u_k(x,y),y+v_k(x,y))+ \\ \partial_y i_k(x+u_k(x,y),y+v_k(x,y)) \quad (3)$$

where $c_3(x,y,k)$ indicates edge information of a pixel whose coordinates are (x,y) in the $k^{th}$ unit image.

Further, to accurately acquire the occlusion tag function, a combination of the foregoing formulas (1), (2), and (3) may be preferentially used, and a calculation formula is as follows:

$$f_k(x, y) = \\ \exp\left\{-\frac{[c_1(x, y; k)]^2}{2\sigma_1^2}\right\}\exp\left\{-\frac{[c_2(x, y; k)]^2}{2\sigma_2^2}\right\}\exp\left\{-\frac{[c_3(x, y; k)]^2}{2\sigma_3^2}\right\} \quad (4)$$

where exp{ } is a Gaussian function, $\sigma_1$ is a standard deviation, corresponding to a Gaussian function $$\exp\left\{-\frac{[c_1(x, y, k)]^2}{2\sigma_1^2}\right\},$$

of normal distribution, $\sigma_2$ is a standard deviation, corresponding to a Gaussian function $$\exp\left\{-\frac{[c_2(x, y, k)]^2}{2\sigma_2^2}\right\},$$

of normal distribution, and $\sigma_3$ is a standard deviation, corresponding to a Gaussian function $$\exp\left\{-\frac{[c_3(x, y, k)]^2}{2\sigma_3^2}\right\},$$

of normal distribution.

$\sigma_1$, $\sigma_2$ and $\sigma_3$ may be adjusted according to a specific reason of occlusion, thereby accurately acquiring the occlusion tag function.

Step 203: Determine a cost function for offset estimation of each unit image according to intensity change information and gradient change information that are of each unit image in the light-field image and the occlusion tag function of each unit image.

Specifically, a light-field intensity consistency assumption principle is:

$$i_1(x,y)=i_k[x+u_k(x,y),y+v_k(x,y)]=i_k[x+\phi_k u_1(x,y),y+v_k v_1(x,y)]$$

where x is a horizontal coordinate of a pixel in a unit image, y is a vertical coordinate of the pixel in the unit image, k is a sequence number of the unit image, k=2, 3, ... $n^2$, $i_1(x,y)$ is intensity information of a first unit image, $i_k(x+u_k(x,y),y+v_k(x,y))$ is intensity information of a pixel whose coordinates are $(x+u_k(x,y),y+v_k(x,y))$ in a $k^{th}$ unit image.

A meaning of the light-field intensity consistency assumption principle is: intensity of a pixel whose coordinates are (x,y) in a first unit image is equal to intensity of a pixel whose coordinates are $(x+u_k(x,y),y+v_k(x,y))$, that is, coordinates obtained after an offset is added to coordinates (x,y), in a $k^{th}$ unit image. $\phi_k$ is a multiple of the offset of the $k^{th}$ unit image in the horizontal direction, and $\psi_k$ is a multiple of the offset of the $k^{th}$ unit image in the vertical direction. $u_k(x,y)=\phi_k u_1(x,y)$ indicates the offset of the $k^{th}$ unit image in the horizontal direction, and $v_k(x,y)=\psi_k u_1(x,y)$ indicates the offset of the $k^{th}$ unit image in the vertical direction.

The following formula is obtained by further deduction:

$$\nabla i_1(x,y)=\nabla i_k[x+u_k(x,y),y+v_k(x,y)]=\nabla i_k[x+\phi_k u_1(x,y),y+\psi_k v_1(x,y)]$$

The formula indicates that gradient information corresponding to the intensity of the pixel whose coordinates are (x,y) in the first unit image is equal to gradient information corresponding to the intensity of the pixel whose coordinates are $(x+u_k(x,y),y+v_k(x,y))$, that is, coordinates obtained after an offset is added to coordinates (x,y), in the $k^{th}$ unit image.

Therefore, based on the foregoing light-field intensity consistency assumption principle, in theory, the intensity of the pixel whose coordinates are (x,y) in the first unit image is equal to the intensity of the pixel whose coordinates are $(x+u_k(x,y),y+v_k(x,y))$, that is, coordinates obtained after an offset is added to coordinates (x,y), in the $k^{th}$ unit image. Therefore, $u_1$ and $v_1$ may be estimated by using the cost function, where it is determined that the cost function for offset estimation of each unit image may be acquired by using a concave function of robustness, that is, a function $\Phi(\ )$.

Specifically, step 203 may be implemented in the following two manners:

Manner 1: A formula (5) is used to determine a cost function $\Gamma_{intensity}(u_1,v_1)$ for offset estimation of each unit image.

$$\Gamma_{intensity}(u_1, v_1) = \sum_{(x,y)\in\chi}\left\{\sum_{k=1}^{n^2} f_k(x,y)\Phi\{\|i_k[x+u_k(x,y), y+v_k(x,y)]-i_1(x,y)\|\}^2 + \alpha\|\nabla i_k[x+u_k(x,y), y+v_k(x,y)]-\nabla i_1(x,y)\|^2\right\} \quad (5)$$

where $\chi$ is a pixel coordinate set of each unit image, $\Phi(\ )$ is a concave function for acquiring robustness, $\nabla$ is a gradient function, and $\alpha$ is an adjustment coefficient of the gradient change information.

$\alpha$ is properly adjusted according to a specific scenario, and a value of $\alpha$ is usually a decimal between 0 to 1.

Manner 2: A formula (6) is used to determine the cost function $\Gamma_{intensity}(u_1,v_1)$ for offset estimation of each unit image.

To acquire the cost function for offset estimation of each unit image more accurately, the cost function for offset estimation of each unit image is determined with reference to a smoothing item of the cost function for offset estimation of each unit image.

Specifically, the cost function $\Gamma_{intensity}(u_1,v_1)$ for offset estimation of each unit image is determined by using the formula (6):

$$\Gamma_{intensity}(u_1,v_1)=\Gamma_{intensity}'(u_1,v_1)+\beta\Gamma_{smooth}(u_1,v_1) \quad (6)$$

where, $$\Gamma_{intensity}'(u_1, v_1) = \sum_{(x,y)\in\chi}\left\{\sum_{k=1}^{n^2} f_k(x,y)\Phi\{\|i_k[x+u_k(x,y), y+v_k(x,y)]-i_1(x,y)\|\}^2 + \alpha\|\nabla i_k[x+u_k(x,y), y+v_k(x,y)]-\nabla i_1(x,y)\|^2\right\}$$

$$\Gamma_{smooth}(u_1, v_1) = \sum_{(x,y)\in\chi}\Phi[\|\nabla u_1(x,y)\|^2+\|\nabla v_1(x,y)\|^2]$$

$\chi$ is a pixel coordinate set of each unit image, $\Phi(\ )$ is a concave function for acquiring robustness, $\nabla$ is a gradient function, $\Gamma_{intensity}'(u_1,v_1)$ is a cost subfunction for offset estimation of each unit image, $\Gamma_{smooth}(u_1,v_1)$ is a smoothing item of the cost function for offset estimation of each unit image, and $\beta$ is an adjustment coefficient of the smoothing item.

The $\beta$ is properly adjusted according to a specific scenario, and a value of the $\beta$ is usually a decimal between 0 to 1.

Step 204: Acquire an offset of each unit image in the light-field image by using the cost function.

Specifically, an offset between every two adjacent unit images in the light-field image may be acquired by using a formula (7):

$$(u^*_1, v^*_1) = \arg\min\{\Gamma_{intensity}(u_1, v_1)\}(u_1, v_1) \quad (7)$$

The offset of each unit image in the light-field image is acquired by using formulas (8) and (9):

$$u_k(x,y) = \phi_k u_1(x,y) \quad (8)$$

$$v_k(x,y) = \psi_k v_1(x,y) \quad (9)$$

where, in the formula (7), arg is an inverse function, min is a function for finding a minimum value, $u^*_1$ is an estimated value of $u_1$, and $v^*_1$ is an estimated value of $v_1$;

$\phi_k$ in the formula (8) is a multiple of the offset of the $k^{th}$ unit image in the horizontal direction, and $\psi_k$ in the formula (9) is a multiple of the offset of the $k^{th}$ unit image in the vertical direction.

According to the foregoing light-field intensity consistency assumption principle, in theory, the intensity of the pixel whose coordinates are (x,y) in the first unit image is equal to the intensity of the pixel whose coordinates are $(x+u_k(x,y), y+v_k(x,y))$, that is, coordinates obtained after an offset is added to coordinates (x,y), in the $k^{th}$ unit image, and corresponding gradient information should also be equal. Therefore, a minimum value of $\Gamma_{intensity}(u_1, v_1)$ in the formula (7) may be obtained. When $\Gamma_{intensity}(u_1, v_1)$ is minimum, a corresponding $(u^*_1, v^*_1)$ is an estimated value closest to $(u_1, v_1)$.

Step 205: Reconstruct a high-resolution light field by using the offset of each unit image.

In this embodiment, a cost function for offset estimation of each unit image is determined by using a formula (5) or (6), then estimated values of $u_1$ and $v_1$ may be accurately acquired by using the cost function and a formula (7), and an offset of each unit image is acquired by using formulas (8) and (9), so as to reconstruct a high-resolution light field.

Figure 3:
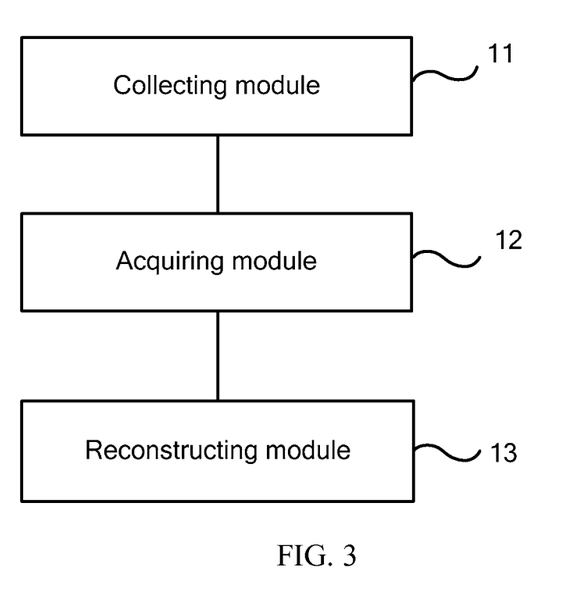
FIG. 3 is a schematic structural diagram of Embodiment 1 of an apparatus for processing a light-field image according to the present invention.

FIG. 3 is a schematic structural diagram of Embodiment 1 of an apparatus for processing a light-field image according to the present invention. As shown in FIG. 3, the apparatus includes: a collecting module 11, an acquiring module 12, and a reconstructing module 13.

The collecting module 11 is configured to acquire a light-field image.

The acquiring module 12 is configured to acquire an occlusion tag function of each unit image in the light-field image, determine a cost function for offset estimation of each unit image according to intensity change information and gradient change information that are of each unit image in the light-field image and the occlusion tag function of each unit image, and acquire an offset of each unit image in the light-field image by using the cost function.

The reconstructing module 13 is configured to reconstruct a high-resolution light field by using the offset of each unit image.

Further, the acquiring module 12 is specifically configured to:

determine the occlusion tag function of each unit image by using at least one of the following formulas (1), (2), and (3):

$$c_1(x,y;k) = \min\{\partial_x u_k(x,y) + \partial_y v_k(x,y), 0\} \quad (1)$$

where x is a horizontal coordinate of a pixel in a unit image, y is a vertical coordinate of the pixel in the unit image, k is a sequence number of the unit image, $u_k(x,y)$ is an offset of a $k^{th}$ unit image in a horizontal direction, $v_k(x,y)$ is an offset of the $k^{th}$ unit image in a vertical direction, $c_1(x,y,k)$ indicates an offset variation of a pixel whose coordinates are (x,y) in the $k^{th}$ unit image in a direction of parallax change, $\partial_x$ indicates that a partial derivative in the horizontal direction is to be found, and $\partial_y$ indicates that a partial derivative in the vertical direction is to be found;

$$c_2(x,y;k) = i_k[x+u_k(x,y), y+v_k(x,y)] - i_1(x,y) \quad (2)$$

where $i_1(x,y)$ is intensity information of a first unit image, $i_k(x+u_k(x,y), y+v_k(x,y))$ is intensity information of a pixel whose coordinates are $(x+u_k(x,y), y+v_k(x,y))$ in the $k^{th}$ unit image, and $c_2(x,y,k)$ indicates a grayscale of a pixel whose coordinates are (x,y) in the $k^{th}$ unit image;

$$c_3(x,y,k) = \partial_x i_1(x,y) + \partial_y i_1(x,y) + \partial_x i_k(x+u_k(x,y), y+v_k(x,y)) + \partial_y i_k(x+u_k(x,y), y+v_k(x,y)) \quad (3)$$

where $c_3(x,y,k)$ indicates edge information of the pixel whose coordinates are (x,y) in the $k^{th}$ unit image.

The occlusion tag function may be:

$$f_k(x, y) = \exp\left\{-\frac{[c_1(x,y;k)]^2}{2\sigma_1^2}\right\}\exp\left\{-\frac{[c_2(x,y;k)]^2}{2\sigma_2^2}\right\}\exp\left\{-\frac{[c_3(x,y;k)]^2}{2\sigma_3^2}\right\} \quad (4)$$

where $\exp\{\ \}$ is a Gaussian function, $\sigma_1$ is a standard deviation, corresponding to a Gaussian function $$\exp\left\{-\frac{[c_1(x,y,k)]^2}{2\sigma_1^2}\right\},$$

of normal distribution, $\sigma_2$ is a standard deviation, corresponding to a Gaussian function $$\exp\left\{-\frac{[c_2(x,y,k)]^2}{2\sigma_2^2}\right\},$$

of normal distribution, and $\sigma_3$ is a standard deviation, corresponding to a Gaussian function $$\exp\left\{-\frac{[c_3(x,y,k)]^2}{2\sigma_3^2}\right\},$$

of normal distribution.

Further, the acquiring module 12 is specifically configured to:

determine a cost function $\Gamma_{intensity}(u_1, v_1)$ for offset estimation of each unit image by using a formula (5):

$$\Gamma_{intensity}(u_1, v_1) = \sum_{(x,y)\in\chi}\left\{\sum_{k=1}^{n^2} f_k(x,y)\Phi\{\|i_k[x+u_k(x,y), y+v_k(x,y)] - i_1(x,y)\|^2 + \alpha\|\nabla i_k[x+u_k(x,y), y+v_k(x,y)] - \nabla i_1(x,y)\|^2\}\right\} \quad (5)$$

where $\chi$ is a pixel coordinate set of each unit image, $\Phi(\ )$ is a concave function for acquiring robustness, $\nabla$ is a gradient function, and $\alpha$ is an adjustment coefficient of the gradient change information.

Alternatively, the acquiring module 12 is specifically configured to:

determine a cost function $\Gamma_{intensity}(u_1,v_1)$ for offset estimation of each unit image by using a formula (6):

$$\Gamma_{intensity}(u_1,v_1)=\Gamma_{intensity}'(u_1,v_1)+\beta\Gamma_{smooth}(u_1,v_1) \quad (6)$$

where, $$\Gamma'_{intensity}(u_1, v_1) = \sum_{(x,y)\in\chi}\left\{\sum_{k=1}^{n^2} f_k(x,y)\Phi\{\|i_k[x+u_k(x,y), y+v_k(x,y)] - i_1(x,y)\|\}^2 + \alpha\|\nabla i_k[x+u_k(x,y), y+v_k(x,y)] - \nabla i_1(x,y)\|^2\}\right\},$$

$$\Gamma_{smooth}(u_1, v_1) = \sum_{(x,y)\in\chi} \Phi[\|\nabla u_1(x,y)\|^2 + \|\nabla v_1(x,y)\|^2],$$

$\chi$ is a pixel coordinate set of each unit image, $\Phi(\ )$ is a concave function for acquiring robustness, $\nabla$ is a gradient function, $\Gamma_{intensity}'(u_1,v_1)$ is a cost subfunction for offset estimation of each unit image, $\Gamma_{smooth}(u_1,v_1)$ is a smoothing item of the cost function for offset estimation of each unit image, and $\beta$ is an adjustment coefficient of the smoothing item.

Further, the acquiring module 12 is specifically configured to:

acquire an offset between every two adjacent unit images in the light-field image by using a formula (7):

$$(u^*_1, v^*_1)=\arg\min\{\Gamma_{intensity}(u_1,v_1)\}(u_1,v_1) \quad (7)$$

acquire the offset of each unit image in the light-field image by using formulas (8) and (9):

$$u_k(x,y)=\phi_k u_1(x,y) \quad (8)$$

$$v_k(x,y)=\psi_k v_1(x,y) \quad (9)$$

where, in the formula (7), arg is an inverse function, min is a function for finding a minimum value, $u^*_1$ is an estimated value of $u_1$, and $v^*_1$ is an estimated value of $v_1$;

$\phi_k$ in the formula (8) is a multiple of the offset of the $k^{th}$ unit image in the horizontal direction, and $\psi_k$ in the formula (9) is a multiple of the offset of the $k^{th}$ unit image in the vertical direction.

The apparatus in this embodiment may be configured to execute a technical solution of the method embodiment shown in FIG. 1 or FIG. 2. An implementation principle and a technical effect of the apparatus are similar, and details are not described herein again.

Figure 4:
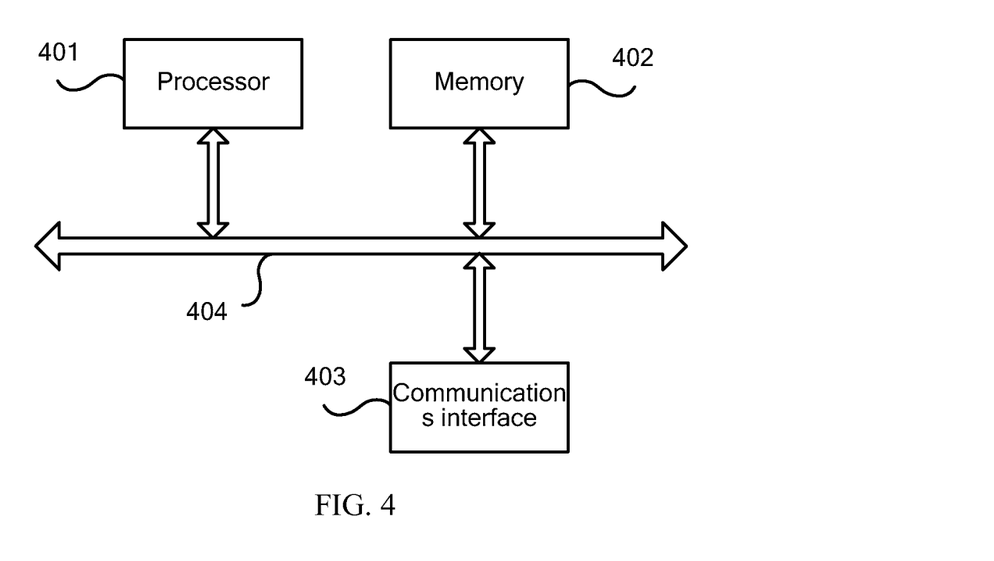
FIG. 4 is a schematic structural diagram of Embodiment 2 of an apparatus for processing a light-field image according to the present invention.

FIG. 4 is a schematic structural diagram of Embodiment 2 of an apparatus for processing a light-field image according to the present invention. As shown in FIG. 4, the apparatus in this embodiment may include: a processor 401, a memory 402, a communications interface 403, and a bus 404. The processor 401, the memory 402, and the communications interface 403 are connected to each other by using the bus 404.

The memory 402 is configured to store a program. Specifically, the program may include program code, where the program code includes a computer operation instruction.

The processor 401 executes the program stored in the memory 402, and implements the following method:

acquiring a light-field image;

acquiring an offset of each unit image in the light-field image according to optical flow change information of the light-field image; and reconstructing a high-resolution light field by using the offset of each unit image.

Further, the acquiring an offset of each unit image in the light-field image according to optical flow change information of the light-field image includes:

determining a cost function for offset estimation of each unit image according to intensity change information and gradient change information that are of each unit image in the light-field image; and acquiring the offset of each unit image in the light-field image by using the cost function.

Further, before the determining a cost function for offset estimation of each unit image according to intensity change information and gradient change information that are of each unit image in the light-field image, the method further includes:

acquiring an occlusion tag function of each unit image; and the determining a cost function for offset estimation of each unit image according to intensity change information and gradient change information that are of each unit image in the light-field image includes:

determining the cost function for offset estimation of each unit image according to the intensity change information and the gradient change information of each unit image in the light-field image and the occlusion tag function of each unit image.

Further, the acquiring an occlusion tag function of each unit image includes:

determining the occlusion tag function of each unit image by using at least one of the following formulas (1), (2), and (3):

$$c_1(x,y;k)=\min\{\partial_x u_k(x,y)+\partial_y v_k(x,y),0\} \quad (1)$$

where x is a horizontal coordinate of a pixel in a unit image, y is a vertical coordinate of the pixel in the unit image, k is a sequence number of the unit image, $u_k(x,y)$ is an offset of a $k^{th}$ unit image in a horizontal direction, $v_k(x,y)$ is an offset of the $k^{th}$ unit image in a vertical direction, $c_1(x,y,k)$ indicates that a boundary pixel of an occluded area has a minus optical flow value, $\partial_x$ indicates that a partial derivative in the direction of x is to be found, and $\partial_y$ indicates that a partial derivative in the direction of y is to be found;

$$c_2(x,y;k)=i_k[x+u_k(x,y),y+v_k(x,y)]-i_1(x,y) \quad (2)$$

where $i_1(x,y)$ is intensity information of a pixel whose coordinates are (x,y) in a first unit image, $i_k(x+u_k(x,y),y+v_k(x,y))$ is intensity information of a pixel whose coordinates are $(x+u_k(x,y),y+v_k(x,y))$ in the $k^{th}$ unit image, and $c_2(x,y,k)$ indicates a grayscale difference between the foregoing two pixels;

$$c_3(x,y,k)=\partial_x i_1(x,y)+\partial_y i_1(x,y)+\partial_x i_k(x+u_k(x,y),y+v_k(x,y))+\partial_y i_k(x+u_k(x,y),y+v_k(x,y)) \quad (3)$$

where $c_3(x,y,k)$ indicates edge information of a pixel whose coordinates are (x,y) in the $k^{th}$ unit image.

Further, the occlusion tag function is:

$$f_k(x, y) = \exp\left\{-\frac{[c_1(x, y; k)]^2}{2\sigma_1^2}\right\}\exp\left\{-\frac{[c_2(x, y; k)]^2}{2\sigma_2^2}\right\}\exp\left\{-\frac{[c_3(x, y; k)]^2}{2\sigma_3^2}\right\} \quad (4)$$

where $\exp\{\ \}$ is a Gaussian function, $\sigma_1$ is a standard deviation, corresponding to a Gaussian function $$\exp\left\{-\frac{[c_1(x, y, k)]^2}{2\sigma_1^2}\right\},$$

of normal distribution, $\sigma_2$ is a standard deviation, corresponding to a Gaussian function $$\exp\left\{-\frac{[c_2(x, y, k)]^2}{2\sigma_2^2}\right\},$$

of normal distribution, and $\sigma_3$ is a standard deviation, corresponding to a Gaussian function $$\exp\left\{-\frac{[c_3(x, y, k)]^2}{2\sigma_3^2}\right\},$$

of normal distribution.

Further, the determining a cost function for offset estimation of each unit image according to intensity change information and gradient change information that are of each unit image in the light-field image and the occlusion tag function of each unit image includes:

determining a cost function $\Gamma_{intensity}(u_1, v_1)$ for offset estimation of each unit image by using a formula (5):

$$\Gamma_{intensity}(u_1, v_1) = \sum_{(x,y)\in\chi}\left\{\sum_{k=1}^{n^2} f_k(x, y)\Phi\{\|i_k[x+u_k(x, y), y+v_k(x, y)] - i_1(x, y)\|\}^2 + \alpha\|\nabla i_k[x+u_k(x, y), y+v_k(x, y)] - \nabla i_1(x, y)\|^2\right\} \quad (5)$$

where $\chi$ is a pixel coordinate set of each unit image, $\Phi(\ )$ is a concave function for acquiring robustness, $\nabla$ is a gradient function, and $\alpha$ is an adjustment coefficient of the gradient change information.

Alternatively, determining a cost function $\Gamma_{intensity}(u_1, v_1)$ for offset estimation of each unit image by using a formula (6):

$$\Gamma_{intensity}(u_1, v_1) = \Gamma_{intensity}(u_1, v_1) + \beta\Gamma_{smooth}(u_1, v_1) \quad (6)$$

where, $$\Gamma'_{intensity}(u_1, v_1) = \sum_{(x,y)\in\chi}\left\{\sum_{k=1}^{n^2} f_k(x, y)\Phi\{\|i_k[x+u_k(x, y), y+v_k(x, y)] - i_1(x, y)\|\}^2 + \alpha\|\nabla i_k[x+u_k(x, y), y+v_k(x, y)] - \nabla i_1(x, y)\|^2\right\},$$

$$\Gamma_{smooth}(u_1, v_1) = \sum_{(x,y)\in\chi}\Phi[\|\nabla u_1(x, y)\|^2 + \|\nabla v_1(x, y)\|^2],$$

$\chi$ is a pixel coordinate set of each unit image, $\Phi(\ )$ is a concave function for acquiring robustness, $\nabla$ is a gradient function, $\Gamma_{intensity}'(u_1, v_1)$ is a cost subfunction for offset estimation of each unit image, $\Gamma_{smooth}(u_1, v_1)$ is a smoothing item of the cost function for offset estimation of each unit image, and $\beta$ is an adjustment coefficient of the smoothing item.

Further, the acquiring the offset of each unit image in the light-field image by using the cost function includes:

acquiring an offset between every two adjacent unit images in the light-field image by using a formula (7):

$$(u^*_1, v^*_1) = \arg\min\{\Gamma_{intensity}(u_1, v_1)\}(u_1, v_1) \quad (7)$$

acquiring the offset of each unit image in the light-field image by using formulas (8) and (9):

$$u_k(x, y) = \phi_k u_1(x, y) \quad (8)$$

$$v_k(x, y) = \psi_k v_1(x, y) \quad (9)$$

where, in the formula (7), arg is an inverse function, min is a function for finding a minimum value, $u^*_1$ is an estimated value of $u_1$, and $v^*_1$ is an estimated value of $v_1$;

$\phi_k$ in the formula (8) is a multiple of the offset of the $k^{th}$ unit image in the horizontal direction, and $\psi_k$ in the formula (9) is a multiple of the offset of the $k^{th}$ unit image in the vertical direction.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disc, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for processing a light-field image, comprising:

acquiring a light-field image;

acquiring an occlusion tag function for each of a plurality of unit images in the light-field image, and determining a cost function for offset estimation of each unit image according to intensity change information and gradient change information for each unit image in the light-field image and the occlusion tag function of each unit image;

acquiring an offset of each unit image in the light-field image using the cost function; and reconstructing a high-resolution light field using the offset of each unit image, wherein the determining a cost function for offset estimation comprises:

determining a cost function $\Gamma_{intensity}(u_1,v_1)$ for offset estimation of each unit image using a formula (6):

$$\Gamma_{intensity}(u_1, v_1) = \Gamma'_{intensity}(u_1, v_1) + \beta \Gamma_{smooth}(u_1, v_1) \quad (6)$$

$$\Gamma'_{intensity}(u_1, v_1) = \sum_{(x,y)\in\chi} \left\{ \sum_{k=1}^{n^2} f_k(x,y)\Phi\{\|i_k[x+u_k(x,y), y+v_k(x,y)] - i_1(x,y)\|\}^2 + \alpha\|\nabla i_k[x+u_k(x,y), y+v_k(x,y)] - \nabla i_1(x,y)\|^2 \right\},$$

wherein, $$\Gamma_{smooth}(u_1, v_1) = \sum_{(x,y)\in\chi} \Phi[\|\nabla u_1(x,y)\|^2 + \|\nabla v_1(x,y)\|^2],$$

$\chi$ is a pixel coordinate set of each unit image, $\Phi(\ )$ is a concave function for acquiring robustness, $\nabla$ is a gradient function, $\Gamma_{intensity}'(u_1,v_1)$ is a cost subfunction for offset estimation of each unit image, $\Gamma_{smooth}(u_1,v_1)$ is a smoothing item of the cost function for offset estimation of each unit image, and $\beta$ is an adjustment coefficient of the smoothing item.

2. A method for processing a light-field image, comprising:

acquiring a light-field image;

acquiring an occlusion tag function for each of a plurality of unit images in the light-field image, and determining a cost function for offset estimation of each unit image according to intensity change information and gradient change information for each unit image in the light-field image and the occlusion tag function of each unit image;

acquiring an offset of each unit image in the light-field image using the cost function; and reconstructing a high-resolution light field using the offset of each unit image, wherein the acquiring an occlusion tag function comprises:

determining the occlusion tag function of each unit image using at least one of the following formulas (1), (2), and (3):

$$c_1(x,y;k) = \min\{\partial_x u_k(x,y) + \partial_y v_k(x,y), 0\} \quad (1)$$

wherein x is a horizontal coordinate of a pixel in a unit image, y is a vertical coordinate of the pixel in the unit image, k is a sequence number of the unit image, $u_k(x,y)$ is an offset of a $k^{th}$ unit image in a horizontal direction, $v_k(x,y)$ is an offset of the $k^{th}$ unit image in a vertical direction, $c_1(x,y,k)$ indicates that a boundary pixel of an occluded area has a negative optical flow value, $\partial_x$ indicates that a partial derivative in the direction of x is to be found, and $\partial_y$ indicates that a partial derivative in the direction of y is to be found;

$$c_2(x,y;k) = i_k[x+u_k(x,y), y+v_k(x,y)] - i_1(x,y) \quad (2)$$

wherein $i_1(x,y)$ is intensity information of a pixel whose coordinates are (x,y) in a first unit image, $i_k(x+u_k(x,y), y+v_k(x,y))$ is intensity information of a pixel whose coordinates are $(x+u_k(x,y), y+v_k(x,y))$ in the $k^{th}$ unit image, and $c_2(x,y,k)$ indicates a grayscale difference between the foregoing two pixels;

$$c_3(x,y,k) = \partial_x i_1(x,y) + \partial_y i_1(x,y) + \partial_x i_k(x+u_k(x,y), y+v_k(x,y)) + \partial_y i_k(x+u_k(x,y), y+v_k(x,y)) \quad (3)$$

wherein $c_3(x,y,k)$ indicates edge information of a pixel whose coordinates are (x,y) in the $k^{th}$ unit image.

3. The method according to claim 2, wherein the occlusion tag function is:

$$f_k(x,y) = \exp\left\{-\frac{[c_1(x,y;k)]^2}{2\sigma_1^2}\right\} \exp\left\{-\frac{[c_2(x,y;k)]^2}{2\sigma_2^2}\right\} \exp\left\{-\frac{[c_3(x,y;k)]^2}{2\sigma_3^2}\right\} \quad (4)$$

wherein $\exp\{\ \}$ is a Gaussian function, $\sigma_1$ is a standard deviation, corresponding to a Gaussian function $$\exp\left\{-\frac{[c_1(x,y,k)]^2}{2\sigma_1^2}\right\},$$

of normal distribution, $\sigma_2$ is a standard deviation, corresponding to a Gaussian function $$\exp\left\{-\frac{[c_2(x,y,k)]^2}{2\sigma_2^2}\right\},$$

of normal distribution, and $\sigma_3$ is a standard deviation, corresponding to a Gaussian function $$\exp\left\{-\frac{[c_3(x,y,k)]^2}{2\sigma_3^2}\right\},$$

of normal distribution.

4. A method for processing a light-field image, comprising:

acquiring a light-field image;

acquiring an occlusion tag function for each of a plurality of unit images in the light-field image, and determining a cost function for offset estimation of each unit image according to intensity change information and gradient change information for each unit image in the light-field image and the occlusion tag function of each unit image;

acquiring an offset of each unit image in the light-field image using the cost function; and reconstructing a high-resolution light field using the offset of each unit image, wherein the determining a cost function for offset estimation comprises:

determining a cost function $\Gamma_{intensity}(u_1,v_1)$ for offset estimation of each unit image using a formula (5):

$$\Gamma_{intensity}(u_1, v_1) = \sum_{(x,y)\in \chi}\left\{\sum_{k=1}^{n^2} f_k(x,y)\Phi\{\|i_k[x+u_k(x,y), y+v_k(x,y)] - i_1(x,y)\|\}^2 + \alpha\|\nabla i_k[x+u_k(x,y), y+v_k(x,y)] - \nabla i_1(x,y)\|^2\right\} \quad (5)$$

wherein $\chi$ is a pixel coordinate set of each unit image, $\Phi(\ )$ is a concave function for acquiring robustness, $\nabla$ is a gradient function, and $\alpha$ is an adjustment coefficient of the gradient change information.

5. The method according to claim 4, wherein the acquiring an offset of each unit image in the light-field image using the cost function comprises:
acquiring an offset between every two adjacent unit images in the light-field image using a formula (7):

$$(u^*_1, v^*_1) = \arg\min\{\Gamma_{intensity}(u_1,v_1)\}(u_1,v_1) \quad (7)$$

acquiring the offset of each unit image in the light-field image using formulas (8) and (9):

$$u_k(x,y) = \phi_k u_1(x,y) \quad (8)$$

$$v_k(x,y) = \psi_k v_1(x,y) \quad (9)$$

wherein, in the formula (7), arg is an inverse function, min is a function for finding a minimum value, $u^*_1$ is an estimated value of $u_1$, and $v^*_1$ is an estimated value of $v_1$;
$\phi_k$ in the formula (8) is a multiple of the offset of the $k^{th}$ unit image in the horizontal direction, and $\psi_k$ in the formula (9) is a multiple of the offset of the $k^{th}$ unit image in the vertical direction.

6. An apparatus for processing a light-field image, comprising a processor and a non-transitory processor-readable medium having processor-executable instructions stored thereon, the processor-executable instructions including a plurality of modules, the modules including:
a collecting module, configured to acquire a light-field image;
an acquiring module, configured to acquire an occlusion tag function for each of a plurality of unit images in the light-field image, determine a cost function for offset estimation of each unit image according to intensity change information and gradient change information for each unit image in the light-field image and the occlusion tag function of each unit image, and acquire an offset of each unit image in the light-field image using the cost function; and
a reconstructing module, configured to reconstruct a high-resolution light field using the offset of each unit image, wherein the acquiring module is configured to:
determine a cost function $\Gamma_{intensity}(u_1,v_1)$ for offset estimation of each unit image using a formula (6):

$$\Gamma_{intensity}(u_1, v_1) = \Gamma'_{intensity}(u_1, v_1) + \beta\Gamma_{smooth}(u_1, v_1) \quad (6)$$

$$\Gamma'_{intensity}(u_1, v_1) =$$

$$\sum_{(x,y)\in \chi}\left\{\sum_{k=1}^{n^2} f_k(x,y)\Phi\{\|i_k[x+u_k(x,y), y+v_k(x,y)] - i_1(x,y)\|\}^2 + \alpha\|\nabla i_k[x+u_k(x,y), y+v_k(x,y)] - \nabla i_1(x,y)\|^2\right\},$$

wherein, $$\Gamma_{smooth}(u_1, v_1) = \sum_{(x,y)\in \chi}\Phi[\|\nabla u_1(x,y)\|^2 + \|\nabla v_1(x,y)\|^2],$$

$\chi$ is a pixel coordinate set of each unit image, $\Phi(\ )$ is a concave function for acquiring robustness, $\nabla$ is a gradient function, $\Gamma_{intensity}'(u_1,v_1)$ is a cost subfunction for offset estimation of each unit image, $\Gamma_{smooth}(u_1,v_1)$ is a smoothing item of the cost function for offset estimation of each unit image, and $\beta$ is an adjustment coefficient of the smoothing item.

7. An apparatus for processing a light-field image, comprising a processor and a non-transitory processor-readable medium having processor-executable instructions stored thereon, the processor-executable instructions including a plurality of modules, the modules including:
a collecting module, configured to acquire a light-field image;
an acquiring module, configured to acquire an occlusion tag function for each of a plurality of unit images in the light-field image, determine a cost function for offset estimation of each unit image according to intensity change information and gradient change information for each unit image in the light-field image and the occlusion tag function of each unit image, and acquire an offset of each unit image in the light-field image using the cost function; and
a reconstructing module, configured to reconstruct a high-resolution light field using the offset of each unit image, wherein the acquiring module is configured to:
determine the occlusion tag function of each unit image using at least one of the following formulas (1), (2), and (3):

$$c_1(x,y;k) = \min\{\partial_x u_k(x,y) + \partial_y v_k(x,y), 0\} \quad (1)$$

wherein x is a horizontal coordinate of a pixel in a unit image, y is a vertical coordinate of the pixel in the unit image, k is a sequence number of the unit image, $u_k(x,y)$ is an offset of a $k^{th}$ unit image in a horizontal direction, $v_k(x,y)$ is an offset of the $k^{th}$ unit image in a vertical direction, $c_1(x,y,k)$ indicates an offset variation of a pixel whose coordinates are (x,y) in the $k^{th}$ unit image in a direction of parallax change, $\delta_x$ indicates that a partial derivative in the horizontal direction is to be found, and $\delta_y$ indicates that a partial derivative in the vertical direction is to be found;

$$c_2(x,y;k) = i_k[x+u_k(x,y), y+v_k(x,y)] - i_1(x,y) \quad (2)$$

wherein $i_1(x,y)$ is intensity information of a first unit image, $i_k(x+u_k(x,y), y+v_k(x,y))$ is intensity information of a pixel whose coordinates are $(x+u_k(x,y), y+v_k(x,y))$ in the $k^{th}$ unit image, and $c_2(x,y,k)$ indicates a grayscale of a pixel whose coordinates are (x,y) in the $k^{th}$ unit image;

$$c_3(x,y,k) = \partial_x i_1(x,y) + \partial_y i_1(x,y) + \partial_x i_k(x+u_k(x,y), y+v_k(x,y)) + \partial_y i_k(x+u_k(x,y), y+v_k(x,y)) \quad (3)$$

wherein $c_3(x,y,k)$ indicates edge information of the pixel whose coordinates are (x,y) in the $k^{th}$ unit image.

8. The apparatus according to claim 7, wherein the occlusion tag function is:

$$f_k(x, y) = \exp\left\{-\frac{[c_1(x, y; k)]^2}{2\sigma_1^2}\right\}\exp\left\{-\frac{[c_2(x, y; k)]^2}{2\sigma_2^2}\right\}\exp\left\{-\frac{[c_3(x, y; k)]^2}{2\sigma_3^2}\right\} \quad (4)$$

wherein $\exp\{\}$ is a Gaussian function, $\sigma_1$ is a standard deviation, corresponding to a Gaussian function $$\exp\left\{-\frac{[c_1(x, y, k)]^2}{2\sigma_1^2}\right\},$$

of normal distribution, $\sigma_2$ is a standard deviation, corresponding to a Gaussian function $$\exp\left\{-\frac{[c_2(x, y, k)]^2}{2\sigma_2^2}\right\},$$

of normal distribution, and $\sigma_3$ is a standard deviation, corresponding to a Gaussian function $$\exp\left\{-\frac{[c_3(x, y, k)]^2}{2\sigma_3^2}\right\},$$

of normal distribution.

9. An apparatus for processing a light-field image, comprising a processor and a non-transitory processor-readable medium having processor-executable instructions stored thereon, the processor-executable instructions including a plurality of modules, the modules including:
a collecting module, configured to acquire a light-field image;
an acquiring module, configured to acquire an occlusion tag function for each of a plurality of unit images in the light-field image, determine a cost function for offset estimation of each unit image according to intensity change information and gradient change information for each unit image in the light-field image and the occlusion tag function of each unit image, and acquire an offset of each unit image in the light-field image using the cost function; and
a reconstructing module, configured to reconstruct a high-resolution light field using the offset of each unit image, wherein the acquiring module is configured to:
determine a cost function $\Gamma_{intensity}(u_1, v_1)$ for offset estimation of each unit image using a formula (5):

$$\Gamma_{intensity}(u_1, v_1) = \sum_{(x,y)\in\chi}\left\{\sum_{k=1}^{n^2} f_k(x, y)\Phi\{\|i_k[x + u_k(x, y), y + v_k(x, y)] - i_1(x, y)\|\}^2 + \alpha\|\nabla i_k[x + u_k(x, y), y + v_k(x, y)] - \nabla i_1(x, y)\|^2\right\} \quad (5)$$

wherein $\chi$ is a pixel coordinate set of each unit image, $\Phi()$ is a concave function for acquiring robustness, $\nabla$ is a gradient function, and $\alpha$ is an adjustment coefficient of the gradient change information.

10. The apparatus according to claim 9, wherein the acquiring module is configured to:
acquire an offset between every two adjacent unit images in the light-field image using a formula (7):

$$(u^*_1, v^*_1) = \arg\min\{\Gamma_{intensity}(u_1, v_1)\}(u_1, v_1) \quad (7)$$

acquire the offset of each unit image in the light-field image using formulas (8) and (9):

$$u_k(x,y) = \phi_k u_1(x,y) \quad (8)$$

$$v_k(x,y) = \psi_k v_1(x,y) \quad (9)$$

wherein, in the formula (7), arg is an inverse function, min is a function for finding a minimum value, $u^*_1$ is an estimated value of $u_1$, and $v^*_1$ is an estimated value of $v_1$;
$\phi_k$ in the formula (8) is a multiple of the offset of the $k^{th}$ unit image in the horizontal direction, and $\psi_k$ in the formula (9) is a multiple of the offset of the $k^{th}$ unit image in the vertical direction.

* * * * *